(12) United States Patent
Wei et al.

(10) Patent No.: US 11,497,106 B2
(45) Date of Patent: Nov. 8, 2022

(54) ROAD LIGHTING MANAGEMENT SYSTEM

(71) Applicants: OPPLE LIGHTING CO., LTD., Shanghai (CN); SUZHOU OPPLE LIGHTING CO., LTD., Suzhou (CN)

(72) Inventors: Qingjun Wei, Shanghai (CN); Hongbao Wang, Shanghai (CN); Zhenhua Zhou, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 17/360,011

(22) Filed: Jun. 28, 2021

(65) Prior Publication Data
US 2021/0400790 A1 Dec. 23, 2021

Related U.S. Application Data

(63) Continuation of application No. PCT/CN2019/128267, filed on Dec. 25, 2019.

(30) Foreign Application Priority Data

Dec. 28, 2018 (CN) .......................... 201811617786.6

(51) Int. Cl.
*H05B 47/19* (2020.01)
*G08C 17/02* (2006.01)
*G16Y 10/75* (2020.01)

(52) U.S. Cl.
CPC ............. *H05B 47/19* (2020.01); *G08C 17/02* (2013.01); *G16Y 10/75* (2020.01)

(58) Field of Classification Search
CPC .......... F21V 5/007; F21V 17/06; F21V 17/10; F21V 17/105; F21V 17/12; F21V 23/005;
(Continued)

(56) References Cited

U.S. PATENT DOCUMENTS

| 7,202,613 B2 * | 4/2007 | Morgan ................. H05B 45/20 315/312 |
| 7,242,152 B2 * | 7/2007 | Dowling .............. H05B 47/155 315/312 |
| 2011/0095914 A1 | 4/2011 | Velado et al. |

FOREIGN PATENT DOCUMENTS

| CN | 102448217 A | 5/2012 |
| CN | 106941754 A | 7/2017 |
| CN | 206708906 U | 12/2017 |

OTHER PUBLICATIONS

International Search Report of PCT Application No. PCT/CN2019/128270 dated Mar. 23, 2020 with English translation, (4p).

* cited by examiner

*Primary Examiner* — Monica C King
(74) *Attorney, Agent, or Firm* — Arch & Lake LLP

(57) ABSTRACT

The present disclosure relates to a road lighting management system, which includes: a smart lighting management cloud platform, lamp poles, lamps installed on the lamp poles, controllers installed in the lamps, and a mobile terminal; in which one lamp or more lamps are installed on each of the lamp poles; the lamps are in one-to-one correspondence with the controllers; the controllers are respectively connected with the lamps and the smart lighting management cloud platform, and the controllers are configured to control the lamps; the mobile terminal is connected with the smart lighting management cloud platform; and both the mobile terminal and the smart lighting management cloud platform are configured for asset management, and control commands are sent by the mobile terminal to the controllers in the lamps according to an instruction of a user.

20 Claims, 4 Drawing Sheets

(58) Field of Classification Search
CPC .......... F21V 23/02; F21V 17/16; F21V 19/00; F21V 19/0045; F21V 23/003; F21V 23/06; F21V 29/70; F21V 3/02; F21V 3/10; F21V 5/04; F21V 5/08; F21Y 2105/10; F21Y 2115/10; F21Y 2105/16; F21K 9/20; F21K 9/69; F21K 9/278; F21S 8/035; F21S 8/085; F21S 8/086; H05B 45/3578

See application file for complete search history.

ROAD LIGHTING MANAGEMENT SYSTEM

CROSS-REFERENCE TO RELATED APPLICATIONS

This application is based upon and claims the priority of PCT patent application No. PCT/CN2019/128267 filed on Dec. 25, 2019 which claims priority to the Chinese patent application No. 201811617786.6 filed on Dec. 28, 2018, the entire content of both of which is hereby incorporated by reference herein for all purposes.

TECHNICAL FIELD

The present disclosure relates to a field of lighting, and specifically relates to a field of road lighting management.

BACKGROUND

With the development of modern lighting systems, the drawbacks of extensive regional road lighting management have gradually discovered. Only relying on manual inspection and timing switch or manual switch cannot effectively manage, status monitor or fault locate a lighting device timely and accurately, furthermore, it is unable to perform early fault prediction, reduce power loss, and reduce urban light pollution.

SUMMARY

The present disclosure provides a road lighting management system and a method of implementing a road lighting management system.

The present disclosure provides a road lighting management system. The system may include a smart lighting management cloud platform, lamp poles, lamps installed on the lamp poles, controllers installed in the lamps, and a mobile terminal.

One lamp or more lamps may be installed on each of the lamp poles; the lamps may be in one-to-one correspondence with the controllers; the controllers may be connected with the lamps and the smart lighting management cloud platform, and may be configured to control the lamps; the mobile terminal may be connected with the smart lighting management cloud platform; and both the mobile terminal and the smart lighting management cloud platform may be configured for asset management, and control commands are sent by the mobile terminal to the controllers in the lamps according to an instruction of a user.

The present disclosure also provides a method of implementing a road lighting management system. The method may include providing a smart lighting management cloud platform, lamp poles, lamps installed on the lamp poles, controllers installed in the lamps, and a mobile terminal; installing one lamp or more lamps on each of the lamp poles; corresponding the lamps with the controllers in one-to-one correspondence; connecting the controllers with the lamps and the smart lighting management cloud platform, and configuring the controllers to control the lamps; connecting the mobile terminal with the smart lighting management cloud platform; and configuring both the mobile terminal and the smart lighting management cloud platform for asset management, and sending, by the mobile terminal, control commands to the controllers in the lamps according to an instruction of a user.

It is to be understood that both the foregoing general description and the following detailed description are exemplary and explanatory only and are not restrictive of the present disclosure.

BRIEF DESCRIPTION OF THE DRAWINGS

In order to clearly illustrate the technical solution of the examples of the present disclosure, the drawings of the examples will be briefly described. It is apparent that the described drawings are only related to some examples of the present disclosure, for those of ordinary skilled in the art, other drawings can be obtained based on these drawings without creative labor.

DETAILED DESCRIPTION

In order to make objects, technical details and advantages of the present disclosure clear, the present disclosure will be further described in detail in connection with the related drawings. It is apparent that the described examples are just a part but not all of the examples of the present disclosure. Based on the described examples in the present disclosure, those ordinary skilled in the art can obtain, without any inventive work, other example(s) which should be within the scope of the present disclosure.

With the gradual deepening of the application of internet of things technology in the field of road lighting monitoring, single-lamp controllers based on NB-IoT have increasingly become the core devices for the road lighting management. However, the current road lighting management system has problems such as poor troubleshooting effectiveness and more cumbersome post-maintenance operations.

First Example

Figure 1:
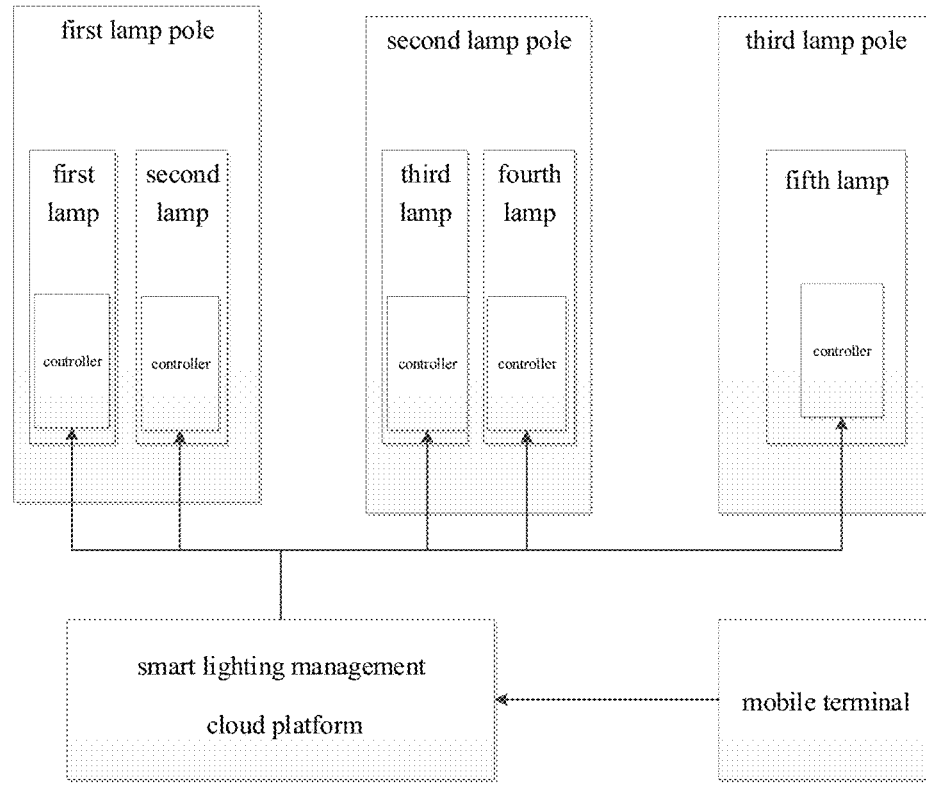
FIG. 1 is a schematic diagram of a preferred road lighting management system according to an example of the present disclosure.

FIG. 1 a schematic diagram of a preferred road lighting management system according to an example of the present disclosure, as shown in FIG. 1, the above-mentioned road lighting management system includes a smart lighting management cloud platform and lamp poles, one lamp or more lamps are installed on each of the lamp poles, a controller is installed in each of the lamps, the controller is respectively connected with the lamp and the smart lighting management cloud platform, the controller is configured to receive a control command sent by the smart lighting management cloud platform, and control the lamp connected with the controller according to the control command. Preferably, a connection method between the controller and the smart lighting management cloud platform is a wireless connection method based on NB-IoT (narrowband internet of things) communication, after the controller receives a wireless signal sent by the smart lighting management cloud platform, the controller realizes operations such as lamp turning on or turning off, dimming, and status monitoring of the lamps. The smart lighting management cloud platform is not only configured to control lamps, but also configured for asset management, such as a creation of regions and groups, device adding, asset statistics, asset positioning, asset maintenance, and failure alarms.

The above-mentioned road lighting management system further includes a mobile terminal, the mobile terminal is connected with the smart lighting management cloud platform, in a case that the mobile terminal obtains a corresponding permission, the mobile terminal can also control the lamps, and remotely realize asset management, and synchronizes management data to the smart lighting management cloud platform.

Second Example

Figure 2:
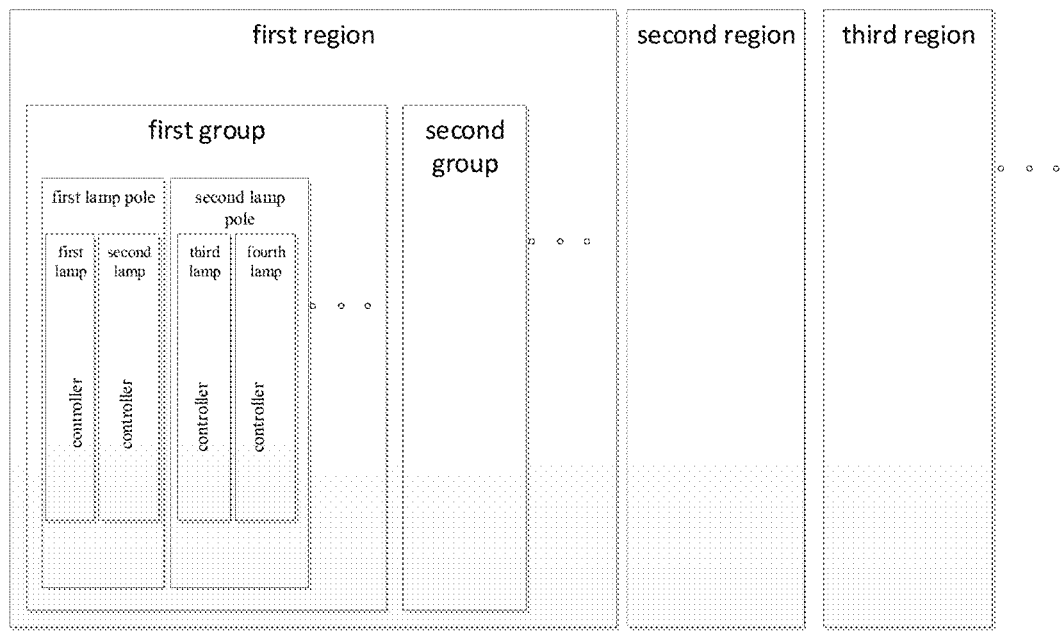
FIG. 2 is a schematic diagram of a hierarchical management of a preferred road lighting management system according to an example of the present disclosure.
Figure 3:
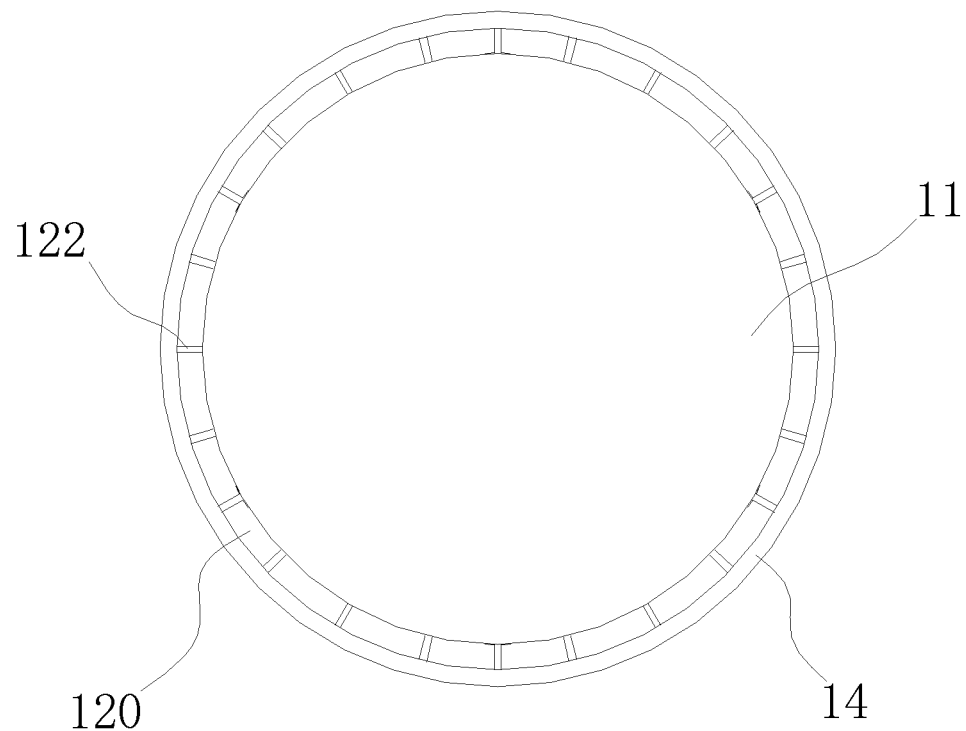
Figure 4:
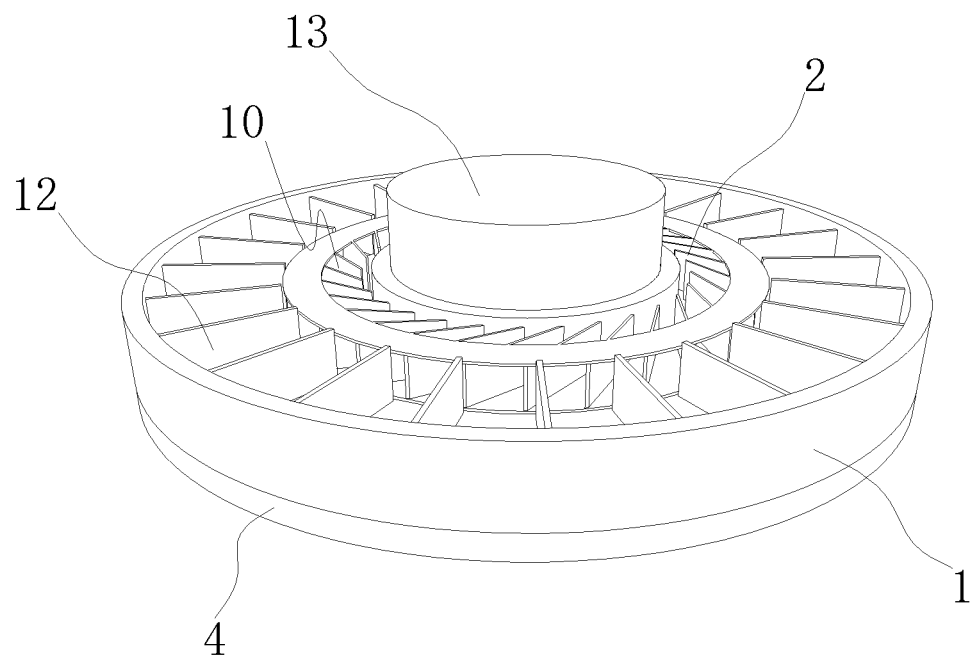
Figure 5:
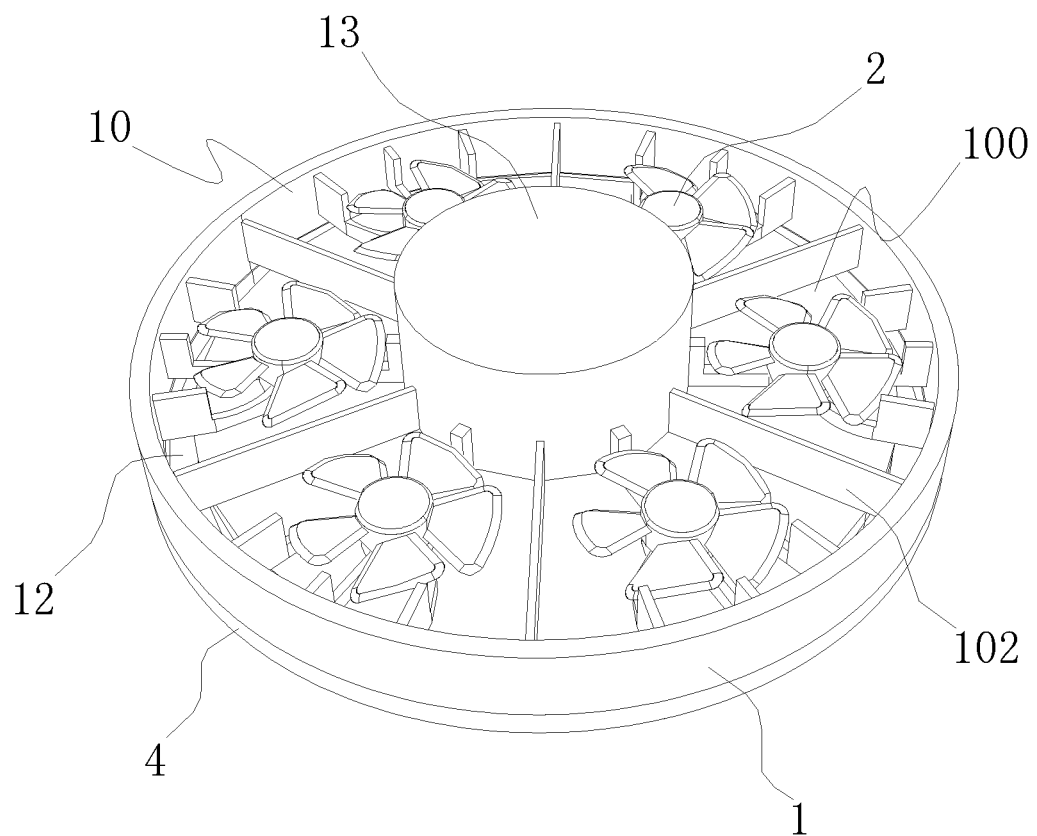
Figure 6:
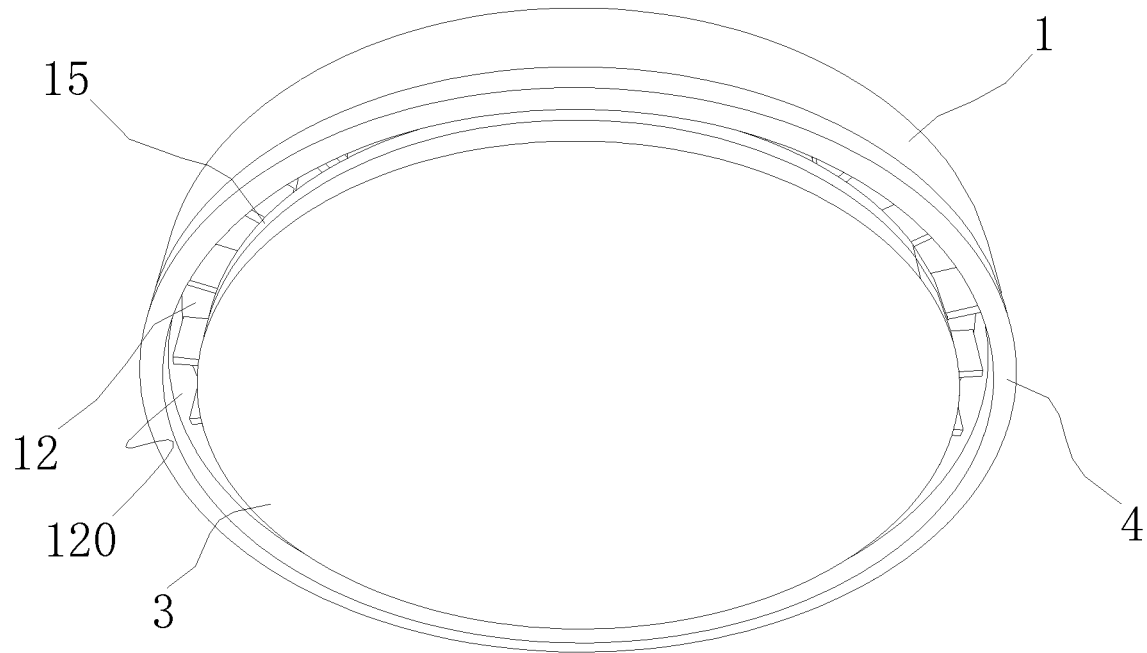
Figure 7:
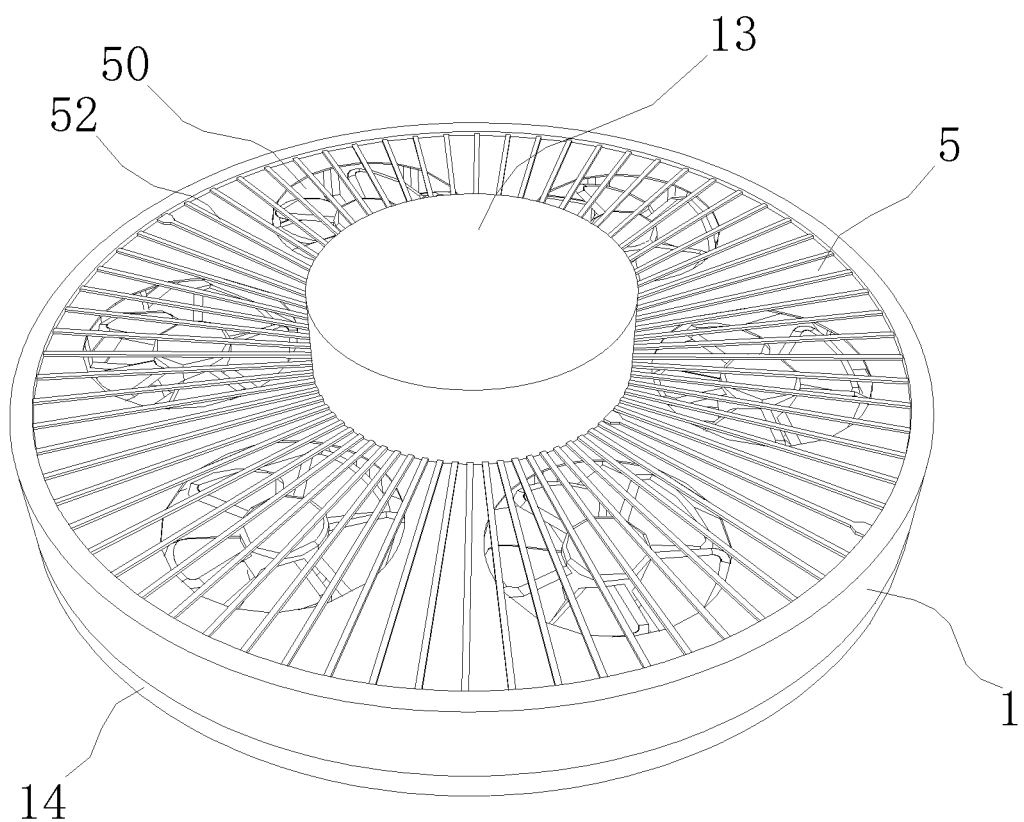

FIG. 2 is a schematic diagram of a hierarchical management of a preferred road lighting management system according to an example of the present disclosure, as shown in FIG. 2, a hierarchical model of the road lighting management system is five layers, which are divided into controllers, lamps, lamp poles, groups, and regions from bottom to top.

A plurality of regions may be created on the smart lighting management cloud platform, and the plurality of the regions may be administrative regions such as counties, districts, townships, or street offices, or may also be named as a customized region name by grouping a plurality of groups together. A plurality of groups are provided in a region, the groups may generally be roads and parks, or a collection of adjacent lamp poles, and operations such as groups control or policy issuance can be conveniently implemented in units of groups. Each of the groups has a plurality of lamp poles, the plurality of lamp poles actually exist physically, which are actual assets, and may be in a variety of forms such as single-head lamp poles, multi-head lamp poles, and projection lamp poles. One lamp or more lamps are provided on a lamp pole. The lamps actually exist physically, and are actual assets, which may be in various forms such as street lamps, floodlights, garden lamps and so on. The lamps are in one-to-one correspondence with the controllers, each of the controllers controls one lamp, the controller may be embedded in the lamp or plugged into the lamp through an external method, and the lamp turning on or turning off, dimming, and status monitoring can be realized by the controller.

Third Example

Asset management, such as a creation of regions and groups, and an addition of devices, can be realized on the smart lighting management cloud platform or a mobile terminal. Details are as follows.

Regions are created on the smart lighting management cloud platform, key parameters of a region are a region name, a latitude and longitude of the region, in which the information of the latitude and the longitude may be picked up through a map on the cloud platform.

Groups are created after creating the regions, and key parameters of a group are a region name, a latitude and longitude, and a group name, in which the region name may be selected through a drop-down menu. The creation of the regions and the groups on the mobile terminal requires special authorization from the smart lighting management cloud platform.

After creating the groups, the lamp poles are added. Adding the lamp poles may be done on the smart lighting management cloud platform, or may be operated on the mobile terminal. Taking operation on the mobile terminal as an example, in a case that a lamp pole is added, information that needs to be filled in includes associated information (the region name, the group name), lamp pole number, UID (user identification code), a latitude and longitude, the number of lamps, and lamp pole information. The associated information is selected through the drop-down menu, a region to be added of the lamp pole is selected firstly, and then a group is selected in the region to which the lamp pole belongs. The lamp pole number is an actual name of the lamp pole, which is generally provided by an owner, the UID is the unique identifier of the lamp pole, which is automatically generated by the mobile terminal and is unique. The latitude and longitude may be obtained by positioning with a positioning device (for example, a handheld GPS device is provided under a lamp pole), or the latitude and longitude may be picked up on a map of the mobile terminal. The number of lamps refers to how many lamps can be connected to the lamp pole; the information of the lamp pole includes information such as a model of the lamp pole and a height of the lamp pole. The lamp poles may be added continuously, and most of the lamp poles on a road are the same, in this case, the above information is just input when adding the lamp pole for the first time, and the UID will automatically change when the next lamp pole is added again, just the latitude and longitude is relocated and the lamp pole number is input, and the other information is the same as the previous lamp pole. After adding the lamp poles on the mobile terminal, the mobile terminal sends the data to the smart lighting management cloud platform for synchronization.

After adding the lamp poles, the lamps are added, adding the lamps may be completed on the smart lighting management cloud platform, and may also be done on the mobile terminal. The information that needs to be filled in includes associated information (a region name, a group name, a pole number and a cantilevered arm), and the lamp information (the lamp information includes a model of the lamp, a power of the lamp, and a UID of the lamp), the associated information actually refers to which lamp pole the lamp should be associated with, and the lamp pole may be selected through a drop-down menu. The lamp information may be obtained by scanning a code through a camera of the mobile terminal (the lamp manufacturer is required to post a two-dimensional code on the lamp as required when a lamp is produced), or the lamp information may also be manually input, in which the model of the lamp indicates an actual manufacturer model of the lamp, the power of the lamp indicates an actual power of the lamp, and the UID is a unique identification of the lamp. Most of information of the lamps on the same road is the same, the above information is just input in a case that the lamp is added for the first time, in a case that a lamp is added again, only the number of the lamp pole and the cantilevered arm needs to be changed, and the two-dimensional code on the lamp is scanned (if no two-dimensional code is provided on the lamp, the mobile terminal may automatically generate a unique UID).

After adding the lamps, controllers are added. Adding the controllers may be done on the smart lighting management cloud platform, or may be done on the mobile terminal. The information that needs to be filled in for adding the controllers includes associated information (a region name, a group name, a lamp UID), and controller information (IMEI, model). The associated information actually indicates which lamp is associated with the controller, the region name and the group name may be selected through drop-down menus, the lamp UID may be obtained by scanning the two-dimensional code of the lamp, or the lamp UID may be input manually. The controller information may be automatically obtained by scanning a two-dimensional code on the controller, or may be manually input, in which a value of the IMEI is a NB module identifier of the controller, which is unique, and the model is a controller device model provided by a controller manufacturer.

Table 1 below is the information that needs to be filled in for creating regions, groups, and adding lamp poles, lamps, and controllers.

TABLE 1

| Sequence of steps | Step name | Key parameters |
|---|---|---|
| 1 | Creating regions | Region names, latitudes and longitudes |
| 2 | Creating groups | Associated information (region names), latitudes and longitudes, group names |
| 3 | Adding lamp poles | Associated information (region names, group names), lamp pole numbers, UIDs, latitudes and longitudes, number of lamps, lamp pole information |
| 4 | Adding lamps | Associated information (region names, group names, lamp pole numbers, cantilevered arms), lamp information (models of the lamps, powers of the lamps, UIDs) |
| 5 | Adding single lamp controllers | Associated information (region names, group names, lamp UIDs), controller information (IMEIs, models) |

Fourth Example

Asset management is realized on a smart lighting management cloud platform or a mobile terminal, and the asset management further includes asset statistics, asset querying, asset positioning, asset maintenance, and fault alarm of the asset, details are as follows.

On the smart lighting management cloud platform, a list of lamp poles, a list of lamps and a device list of the controllers may be counted according to regions or groups, and detailed device information (the information is input in a case that a device is added) may be queried, and the information list of devices is exported through an export button. Mutual check may be made through the correlation of the lamp poles, the lamps, and the controllers. In a case that the smart lighting management cloud platform detects failure or damage of a device through each of the single lamp controllers, an alarm will be sent out on the smart lighting management cloud platform, and the failure information is sent to the mobile terminal. Failure statistics or alarm information statistics may be performed on the smart lighting management cloud platform, and failure devices may be arranged according to the failure or the method of alarm (such as not online, not lighting, electrical parameter violation, etc.) and time of occurrence, and the devices can be quickly positioned through the latitudes and longitudes of the devices. The UID or IMEI of the damaged device may be also input for location query, and a navigation button is clicked to automatically invoke a navigation software to guide you to find the damaged device.

In a case that a controller is damaged and needs to be replaced, the controller may be deleted through the mobile terminal or the smart lighting management cloud platform, and a controller may be added again according to the above adding method. In a case that a lamp is damaged and needs to be replaced, the original lamp is deleted firstly and then a new lamp is added according to the above method, and then the controller corresponding to the original lamp is found to be modified according to an associated lamp. In a case that a lamp pole needs to be replaced, the original lamp pole is just removed, and the original lamp pole number is pasted on a new lamp pole.

The present disclosure is to provide a road lighting management system, which comprises: a smart lighting management cloud platform, lamp poles, lamps installed on the lamp poles, controllers installed in the lamps, and a mobile terminal; in which one lamp or more lamps are installed on each of the lamp poles; the lamps are in one-to-one correspondence with the controllers; the controllers are respectively connected with the lamps and the smart lighting management cloud platform, and are configured to control the lamps; the mobile terminal is connected with the smart lighting management cloud platform; and both the mobile terminal and the smart lighting management cloud platform are configured for asset management, and sending control commands to the controllers in the lamps according to an instruction of a user.

Further, two-dimensional codes are respectively provided on the lamps and the controllers; and the two-dimensional codes comprise lamp information and controller information.

Further, the controllers controlling the lamps comprises the controllers at least controlling turning on or turning off, dimming and status monitoring of the lamps, respectively.

Further, the mobile terminal sending control commands to the controllers in the lamps according to an instruction of a user comprises: after the mobile terminal receiving the user's operation instruction, the mobile terminal sending the control commands to the controllers in the lamps through the smart lighting management cloud platform.

Further, the smart lighting management cloud platform being configured for asset management comprises a creation of regions and groups, and an addition of lamp poles, lamps, and controllers.

Further, the smart lighting management cloud platform being configured for asset management further comprises asset statistics, asset querying, asset positioning, asset maintenance, and fault alarm of the asset.

Further, the asset statistics and the asset querying comprise: creating a list of lamp poles, a list of lamps, and a device list of controllers according to the regions and the groups, querying detailed device information, and exporting an information list of the device by an export button.

Further, the asset positioning comprises rapid device positioning through a latitude and longitude of the device, and inputting a UID or an IMEI of a damaged device for location query.

Further, the fault alarm comprises that, in a case that a certain device fails, the controller sends fault information to the smart lighting management cloud platform, and the smart lighting management cloud platform simultaneously sends the fault information to the mobile terminal for alarming.

Further, the asset maintenance comprises that, in a case that the controller is damaged and needs to be replaced, the controller is deleted by the mobile terminal or the smart lighting management cloud platform, and a new controller is re-added according to an adding method; or in a case that a lamp is damaged and needs to be replaced, an original lamp is firstly deleted and then a new lamp is added, and then the controller corresponding to the original lamp is found and is modified according to an associated lamp; or in a case that a lamp pole needs to be replaced, an original lamp pole is removed and a pole number of the original lamp pole is pasted on a new lamp pole.

Further, in a case that no two-dimensional code is provided on the lamp or the controller, the lamp information and the controller information is manually input.

Further, the lamp information comprises a model of the lamp, a power of the lamp, and a UID of the lamp.

Further, the controller information comprises an IMEI of the controller and a model of the controller.

Further, a connection method between the controller and the smart lighting management cloud platform is a wireless connection method based on NB-IoT communication.

The beneficial effects of the present disclosure are that the road lighting management system in the present disclosure sets the devices hierarchically, which can control lamps and manage assets through a cloud platform and a mobile terminal, respectively, so that the convenience of maintenance is enhanced, in addition, a two-dimensional code is added to the device to facilitate maintenance personnel to easily obtain the information of the device, so that the work efficiency of the maintenance personnel is improved.

The present disclosure provides a method of implementing a road lighting management system. The method may include providing a smart lighting management cloud platform, lamp poles, lamps installed on the lamp poles, controllers installed in the lamps, and a mobile terminal; installing one lamp or more lamps on each of the lamp poles; corresponding the lamps with the controllers in one-to-one correspondence; connecting the controllers with the lamps and the smart lighting management cloud platform, and configuring the controllers to control the lamps; connecting the mobile terminal with the smart lighting management cloud platform; and configuring both the mobile terminal and the smart lighting management cloud platform for asset management, and sending, by the mobile terminal, control commands to the controllers in the lamps according to an instruction of a user.

The method may include providing two-dimensional codes on the lamps and the controllers wherein the two-dimensional codes may include lamp information and controller information.

The method may include, after the mobile terminal receiving the user's operation instruction, sending, by the mobile terminal, the control commands to the controllers in the lamps through the smart lighting management cloud platform.

The method may also include providing a creation of regions and groups, and an addition of lamp poles, lamps, and controllers for the smart lighting management cloud platform.

The method may also include providing asset statistics, asset querying, asset positioning, asset maintenance, and fault alarm of the asset to the smart lighting management cloud platform being configured for asset management.

The method may further include creating a list of lamp poles, a list of lamps, and a device list of controllers according to the regions and the groups, querying detailed device information, and exporting an information list of the device by an export button.

Although the examples of the present disclosure have been described, those skilled in the art can make additional changes and modifications to these examples once they learn the basic creative concept.

Those skilled in the art can make various changes and modifications to the present disclosure without departing from the spirit and scope of the present disclosure. In this way, if these modifications and variations of the present disclosure fall within the scope of the present disclosure and their equivalent technologies, the present disclosure is also intended to include these modifications and variations.

What is claimed is:

1. A road lighting management system, comprising: a smart lighting management cloud platform, lamp poles, lamps installed on the lamp poles, controllers installed in the lamps, and a mobile terminal; wherein:
   one lamp or more lamps are installed on each of the lamp poles;
   the lamps are in one-to-one correspondence with the controllers;
   the controllers are connected with the lamps and the smart lighting management cloud platform, and are configured to control the lamps;
   the mobile terminal is connected with the smart lighting management cloud platform; and
   both the mobile terminal and the smart lighting management cloud platform are configured for asset management, and control commands are sent by the mobile terminal to the controllers in the lamps according to an instruction of a user.

2. The road lighting management system according to claim 1, wherein two-dimensional codes are provided on the lamps and the controllers; and the two-dimensional codes comprise lamp information and controller information.

3. The road lighting management system according to claim 1, wherein the controllers controlling the lamps comprises the controllers at least controlling turning on or turning off, dimming and status monitoring of the lamps.

4. The road lighting management system according to claim 1, wherein, after the mobile terminal receiving the user's operation instruction, the mobile terminal sends the control commands to the controllers in the lamps through the smart lighting management cloud platform.

5. The road lighting management system according to claim 1, wherein the smart lighting management cloud platform being configured for asset management comprises a creation of regions and groups, and an addition of lamp poles, lamps, and controllers.

6. The road lighting management system according to claim 5, wherein the smart lighting management cloud platform being configured for asset management further comprises asset statistics, asset querying, asset positioning, asset maintenance, and fault alarm of the asset.

7. The road lighting management system according to claim 6, wherein the asset statistics and the asset querying comprise: creating a list of lamp poles, a list of lamps, and a device list of controllers according to the regions and the groups, querying detailed device information, and exporting an information list of the device by an export button.

8. The road lighting management system according to claim 7, wherein the asset positioning comprises rapid device positioning through a latitude and longitude of the device, and inputting a UID or an IMEI of a damaged device for location query.

9. The road lighting management system according to claim 6, wherein the fault alarm comprises that, in a case that a certain device fails, the controller sends fault information to the smart lighting management cloud platform, and the smart lighting management cloud platform simultaneously sends the fault information to the mobile terminal for alarming.

10. The road lighting management system according to claim 6, wherein the asset maintenance comprises that, in a case that the controller is damaged and needs to be replaced, the controller is deleted by the mobile terminal or the smart lighting management cloud platform, and a new controller is re-added according to an adding method; or in a case that a lamp is damaged and needs to be replaced, an original lamp is firstly deleted and then a new lamp is added, and the controller corresponding to the original lamp is found and is modified according to an associated lamp; or in a case that a lamp pole needs to be replaced, an original lamp pole is removed and a pole number of the original lamp pole is pasted on a new lamp pole.

11. The road lighting management system according to claim 2, wherein, in a case that no two-dimensional code is provided on the lamp or the controller, the lamp information and the controller information are manually input.

12. The road lighting management system according to claim 2, wherein the lamp information comprises a model of the lamp, a power of the lamp, and a UID of the lamp.

13. The road lighting management system according to claim 2, wherein the controller information comprises an IMEI of the controller and a model of the controller.

14. The road lighting management system according to claim 1, wherein a connection method between the controller and the smart lighting management cloud platform is a wireless connection method based on NB-IoT communication.

15. A method of implementing a road lighting management system, comprising:
    providing a smart lighting management cloud platform, lamp poles, lamps installed on the lamp poles, controllers installed in the lamps, and a mobile terminal;
    installing one lamp or more lamps on each of the lamp poles;
    corresponding the lamps with the controllers in one-to-one correspondence;
    connecting the controllers with the lamps and the smart lighting management cloud platform, and configuring the controllers to control the lamps;
    connecting the mobile terminal with the smart lighting management cloud platform; and
    configuring both the mobile terminal and the smart lighting management cloud platform for asset management, and sending, by the mobile terminal, control commands to the controllers in the lamps according to an instruction of a user.

16. The method of claim 15, further comprising: providing two-dimensional codes on the lamps and the controllers wherein the two-dimensional codes comprise lamp information and controller information.

17. The method of claim 15, further comprising: after the mobile terminal receiving the user's operation instruction, sending, by the mobile terminal, the control commands to the controllers in the lamps through the smart lighting management cloud platform.

18. The method of claim 15, further comprising: providing a creation of regions and groups, and an addition of lamp poles, lamps, and controllers for the smart lighting management cloud platform.

19. The method of claim 18, further comprising: providing asset statistics, asset querying, asset positioning, asset maintenance, and fault alarm of the asset to the smart lighting management cloud platform being configured for asset management.

20. The method of claim 19, further comprising: creating a list of lamp poles, a list of lamps, and a device list of controllers according to the regions and the groups, querying detailed device information, and exporting an information list of the device by an export button.

* * * * *